(12) United States Patent
Du et al.

(10) Patent No.: US 11,979,216 B2
(45) Date of Patent: May 7, 2024

(54) ANTENNA ARRAY DECOUPLING METHOD, APPARATUS AND SYSTEM, AND STORAGE MEDIUM

(71) Applicant: XI'AN ZHONGXING NEW SOFTWARE CO., LTD., Xi'an (CN)

(72) Inventors: Wenhao Du, Shenzhen (CN); Yanru Cao, Shenzhen (CN); Dongfang Ning, Shenzhen (CN); Zhengjian Dai, Shenzhen (CN); Zuofeng Zhang, Shenzhen (CN); Qiulin Huang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 44 days.

(21) Appl. No.: 17/758,090

(22) PCT Filed: Dec. 28, 2020

(86) PCT No.: PCT/CN2020/140198
§ 371 (c)(1),
(2) Date: Jun. 28, 2022

(87) PCT Pub. No.: WO2021/136185
PCT Pub. Date: Jul. 8, 2021

(65) Prior Publication Data
US 2023/0035416 A1    Feb. 2, 2023

(30) Foreign Application Priority Data
Dec. 31, 2019   (CN) .................. 201911409249.7

(51) Int. Cl.
*H04B 7/08*   (2006.01)
*H04B 7/0413*   (2017.01)
*H04B 7/0456*   (2017.01)

(52) U.S. Cl.
CPC ......... *H04B 7/0842* (2013.01); *H04B 7/0413* (2013.01); *H04B 7/0456* (2013.01)

(58) Field of Classification Search
CPC .. H04B 7/0842; H04B 7/0456; H04B 7/0617; H04B 7/0697; H04B 7/0413; H04B 7/06; H04B 7/0608; H04B 7/08; H04B 7/086
See application file for complete search history.

(56) References Cited

U.S. PATENT DOCUMENTS 9,749,031 B2 *   8/2017   Ali ..................... H04B 1/0458
10,516,467 B2 *  12/2019   Hujanen ................ H04B 7/086
2016/0301460 A1 * 10/2016   Ali ..................... H04B 1/0475

FOREIGN PATENT DOCUMENTS

| CN | 101465682 A | 6/2009 |
| CN | 102447504 A | 5/2012 |

(Continued)

OTHER PUBLICATIONS

International Searching Authority. International Search Report and Written Opinion for PCT Application No. PCT/CN2020/140198 and English translation, mailed Mar. 25, 2021, pp. 1-9.

(Continued)

*Primary Examiner* — Betsy Deppe
(74) *Attorney, Agent, or Firm* — Vivacqua Crane, PLLC

(57) ABSTRACT

An antenna array decoupling method, apparatus and system, and a non-transitory computer-readable storage medium are disclosed. The method may include: receiving predetermined digital domain signals of a plurality of channels, each of the plurality of channels being a data channel corresponding to a respective one of array elements in an antenna array (S110); determining decoupling factors of channels involved in decoupling corresponding to each channel, the decoupling factors being factors which have been solved for beforehand according to measured in-array pattern information of each array element in the antenna array (S120); and (Continued)

processing the predetermined digital domain signals of the channels involved in decoupling corresponding to each channel according to the decoupling factors to obtain a 10 decoupled predetermined digital domain signal of each channel (S130).

12 Claims, 9 Drawing Sheets

(56) References Cited

FOREIGN PATENT DOCUMENTS

| | | | |
|---|---|---|---|
| CN | 106450801 A | | 2/2017 |
| JP | H09148836 A | | 6/1997 |
| JP | H090148836 | * | 6/1997 |
| WO | 2017009972 A1 | | 1/2017 |
| WO | 2018205393 A1 | | 11/2018 |

OTHER PUBLICATIONS

European Patent Office. Extended European Search Report for EP Application No. 20908781.6, mailed Dec. 23, 2022, pp. 1-8.

* cited by examiner

ANTENNA ARRAY DECOUPLING METHOD, APPARATUS AND SYSTEM, AND STORAGE MEDIUM

CROSS-REFERENCE TO RELATED APPLICATION

This application is a national stage filing under 35 U.S.C. § 371 of international application number PCT/CN2020/140198, filed on Dec. 28, 2020, which claims priority to Chinese patent application No. 201911409249.7 filed on Dec. 31, 2019. The contents of these applications are incorporated herein by reference in their entirety.

TECHNICAL FIELD

Embodiments of the present disclosure relate to the field of communications technologies, in particular to an antenna array decoupling method, apparatus and system and a non-transitory computer-readable storage medium.

BACKGROUND

With the rapid maturation and application of the 5th generation wireless systems (5G) technology, faster data transmission, lower transmission delay and higher reliability are required. With this background, the 5G massive multiple input multiple output (MIMO) technology can use multiple antennas to improve data throughput and communication stability without increasing the communication bandwidth.

Due to the limited actual space, the volume of an antenna array cannot be too large. Under the circumstance that the physical size of the antenna array is limited, the mutual coupling and interference between multiple antenna elements will inevitably lead to the degradation of antenna performance. Hardware decoupling is adopted mostly at present, for example, by arranging a defected ground structure, a partition board, a decoupling network and the like around an antenna. However, hardware decoupling schemes have certain decoupling limits, and are generally low in decoupling efficiency in the case of tight coupling; besides, additional hardware is required, so the difficulty and pressure of antenna design are increased.

SUMMARY

An embodiment in accordance with an aspect of the present disclosure provides an antenna array decoupling method, which may include: receiving predetermined digital domain signals of a plurality of channels, each of the plurality of channels being a data channel corresponding to a respective one of array elements in an antenna array; determining decoupling factors of channels involved in decoupling corresponding to each channel, the decoupling factors being factors that have been solved for beforehand according to measured in-array pattern information of each array element in the antenna array; and processing the predetermined digital domain signals of the channels involved in decoupling corresponding to each channel according to the decoupling factors to obtain a decoupled predetermined digital domain signal of each channel.

An embodiment in accordance with an aspect of the present disclosure provides an antenna array decoupling apparatus, which may include: a signal receiving module configured to receive predetermined digital domain signals of a plurality of channels, each of the plurality of channels being a data channel corresponding to a respective one of array elements in an antenna array; a factor loading module configured to determine decoupling factors of channels involved in decoupling corresponding to each channel, the decoupling factors being factors that have been solved for beforehand according to measured in-array pattern information of each array element in the antenna array; and a signal decoupling module configured to process the predetermined digital domain signals of the channels involved in decoupling corresponding to each channel according to the decoupling factors to obtain a decoupled predetermined digital domain signal of each channel.

An embodiment in accordance with an aspect of the present disclosure provides a communication system, which may include: an antenna array decoupling factor storage configured to store decoupling factors of data channels corresponding to array elements in an antenna array, the decoupling factors being factors that have been solved for beforehand according to measured in-array pattern information of each array element in the antenna array; and an antenna array decoupling system configured to receive predetermined digital domain signals of a plurality of channels, each of the plurality of channels corresponding to a respective one of array elements in the antenna array; to determine decoupling factors of channels involved in decoupling corresponding to each channel; and to process the predetermined digital domain signals of the channels involved in decoupling corresponding to each channel according to the decoupling factors to obtain a decoupled predetermined digital domain signal of each channel.

An embodiment in accordance with an aspect of the present disclosure provides an antenna array decoupling system, which may include: a memory and a processor, where the memory is configured to store a program; and the processor is configured to execute executable program codes stored in the memory to perform the antenna array decoupling method described above.

An embodiment in accordance with an aspect of the present disclosure provides a non-transitory computer-readable storage medium storing instructions configured to, when executed by a computer, cause the computer to perform the antenna array decoupling method described in the above aspects.

BRIEF DESCRIPTION OF DRAWINGS

The accompanying drawings are used to provide a further understanding of the present disclosure and constitute a part of the description. The accompanying drawings are used to explain the present disclosure together with the detailed description below, and do not constitute a restriction on the present disclosure.

DETAILED DESCRIPTION

Figure 1:
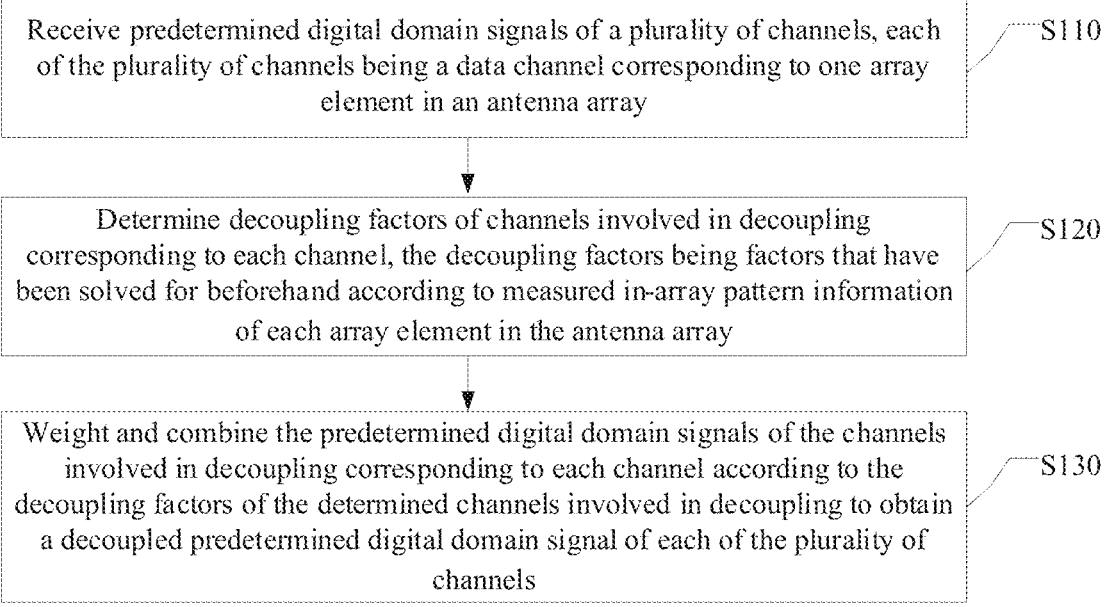
FIG. 1 is a flowchart of an antenna array decoupling method according to an embodiment of the present disclosure.

Specific embodiments of the present disclosure will be described in further detail with reference to the accompanying drawings below. It should be understood that the specific implementations described here are only intended to describe and explain the present disclosure and are not intended to limit the present disclosure. For those having ordinary skill in the art, the present disclosure can be practiced without some of these specific details. The following description of the embodiments is only to provide a better understanding of the present disclosure by showing examples of the present disclosure.

It should be noted that in this context, the terms "comprise," "include" or any variation thereof are intended to cover a non-exclusive inclusion, such that a process, method, article, or apparatus that includes a series of elements not only includes those listed elements but also includes other elements not expressly listed or also includes inherent elements of such a process, method, article, or apparatus. Without additional constraints, an element preceded by "comprises/includes a/an" does not preclude the existence of additional identical elements in the process, method, article, or apparatus that comprises/includes the element.

An antenna is a device for transmitting and receiving electromagnetic energy. An antenna array refers to an antenna system formed by regularly or randomly arranging multiple antenna elements together, and an antenna element refers to each independent antenna in the antenna array. The antenna element may also be referred to as an antenna array element or array element. When the antenna elements in the antenna array are arranged in one and the same plane, the antenna array can be called a planar or two-dimensional array, and the antenna elements in the planar array can be arranged in different shapes, for example to form a circular array or a rectangular array.

Due to the limited actual space, the volume of the antenna array cannot be too large. Under the circumstance that the physical size of the antenna array is limited, the mutual coupling and interference between multiple antenna elements will inevitably lead to the degradation of antenna performance, which can be manifested mainly in the following aspects: first, due to a high sidelobe level, the beam scanning ability of the array is greatly affected; second, due to the mutual interference between the antenna elements, the signal-to-noise ratio is degraded, which directly affects data throughput; and third, due to the reduction of effective radiation energy, the gain of the antenna array decreases and the energy utilization efficiency is low.

Therefore, in order to reduce the volume of the antenna array and the cost of research and development while maintaining the original performance of the antenna array, hardware decoupling is adopted mostly at present, for example, by arranging a defected ground structure, a partition board, a decoupling network and the like around an antenna. However, hardware decoupling schemes have certain decoupling limits, and are generally low in decoupling efficiency in the case of tight coupling; besides, additional hardware is required, so the difficulty and pressure of antenna design are increased.

An embodiment of the present disclosure provides an antenna array decoupling method which can realize decoupling in a digital domain without increasing the difficulty of antenna design, thus effectively reducing the coupling influence on the antenna array and improving system performance.

FIG. 1 is a flowchart of an antenna array decoupling method according to an embodiment of the present disclosure. As shown in FIG. 1, the antenna array decoupling method may include steps S110-S130.

At S110, predetermined digital domain signals of a plurality of channels are received, each of the plurality of channels is a data channel corresponding to a respective one of array elements in an antenna array.

At S120, decoupling factors of channels involved in decoupling corresponding to each channel are determined, the decoupling factors are factors that have been solved for beforehand according to measured in-array pattern information of each array element in the antenna array.

At S130, the predetermined digital domain signals of the channels involved in decoupling corresponding to each channel are processed, according to the decoupling factors to obtain a decoupled predetermined digital domain signal of each channel.

In the antenna array decoupling method according to the embodiment of the present disclosure, the decoupling factors of the antenna array can be solved for by measuring in-array patterns of the array elements in the antenna array of a base station beforehand, and then the corresponding decoupling parameters are loaded for the received digital domain signals of the plurality of channels to realize decoupling.

As a decoupling matrix for the antenna array in the method according to the embodiment of the present disclosure is obtained through pattern measuring and additional hardware is not required, the problems of high sidelobe level, degraded array beam scanning capability, reduced effective radiation and serious crosstalk between antenna elements caused by base station antenna coupling can be effectively solved without increasing the difficulty of antenna design, so that the system performance of 5G MIMO communication systems and 5G Massive MIMO communication systems can be improved, and the decoupling of the antenna array reduces the influence of array coupling and improves system performance.

A construction process of the decoupling matrix is described below in combination with specific embodiments. In an embodiment, the following steps are executed before the above step S110.

At S101, in-array pattern information of the array elements in the antenna array at a plurality of sampling points in a space is measured at a predetermined frequency point, the in-array pattern information of a respective one of array elements in the antenna array being pattern information measured when only the respective one of array elements is excited.

In this step, the in-array pattern of each array element represents an in-array pattern measured when only the array element in question is excited and no other array element in the array is excited. As the array elements in the measured antenna array are coupled to each other, the antenna array being measured can be called a coupled array.

At S102, in-array pattern information of array elements in an ideal antenna array at the plurality of sampling points is calculated at the predetermined frequency point, the ideal antenna array being an antenna array without coupling which is simulated according to an array arrangement of the antenna array.

In this step, the ideal antenna array can be an antenna array constructed in a simulation or emulation environment with the same array arrangement as the array arrangement of the actual antenna array. An in-array pattern of the ideal array contains a pattern of an isolated array element and an array factor pattern caused by an array position of the array element (relative to an array position of a reference array element).

At S103, decoupling factors of the array elements in the antenna array at the predetermined frequency point are obtained by correcting the measured in-array pattern information of the array elements in the antenna array with the in-array pattern information of the array elements in the ideal antenna array.

In an embodiment of the present disclosure, by using the in-array pattern information of the array elements in the ideal antenna array, the in-array pattern information of the array elements in the coupled array is corrected to obtain decoupling factors of the array elements in the antenna array at the predetermined frequency point. The decoupling factor solving method is applicable to various antenna models.

In an embodiment, the above step S103 may specifically include the following sub-steps.

At S1031, a first in-array pattern matrix is generated according to the in-array pattern information of the array elements in the antenna array measured at the predetermined frequency point.

At S1032, a second in-array pattern matrix is generated according to the in-array pattern information of the array elements in the ideal antenna array at the predetermined frequency point.

At S1033, a generalized inverse matrix of the first in-array pattern matrix and the second in-array pattern matrix is multiplied to obtain a decoupling matrix of the antenna array at the predetermined frequency point.

At S1034, M decoupling factors of each array element in the antenna array are extracted from the decoupling matrix, the M decoupling factors correspond to M array elements in the antenna array, and M is an integer greater than or equal to 2.

In the embodiment of the present disclosure, due to the fact that decoupling factors change with frequency, generally, a set of decoupling factors can be configured for the antenna array every other predetermined frequency interval.

In the above embodiment, the predetermined frequency point is a frequency point in a broadband environment where the antenna array in a base station works, which is determined according to the bandwidth of signals received by the antenna array and a predetermined frequency interval.

Base station antennas generally work in a broadband environment, coupling relationships between array elements in the base station antennas change with frequency points, so generally, in order to meet the requirements of broadband decoupling, it is necessary to measure at different frequency points to obtain several sets of decoupling matrices for the antenna array. For example, the minimum number of decoupling factor sets needed in a system can be calculated based on a ratio of the signal bandwidth to the predetermined frequency interval.

For example, a preset frequency can be determined according to an actual application scenario. Taking a frequency band of 2.6 GHz as an example, the signal bandwidth is 160 MHz, the frequency interval is 40 MHz, and thus at least 4 sets of decoupling factors are needed.

Figure 2:
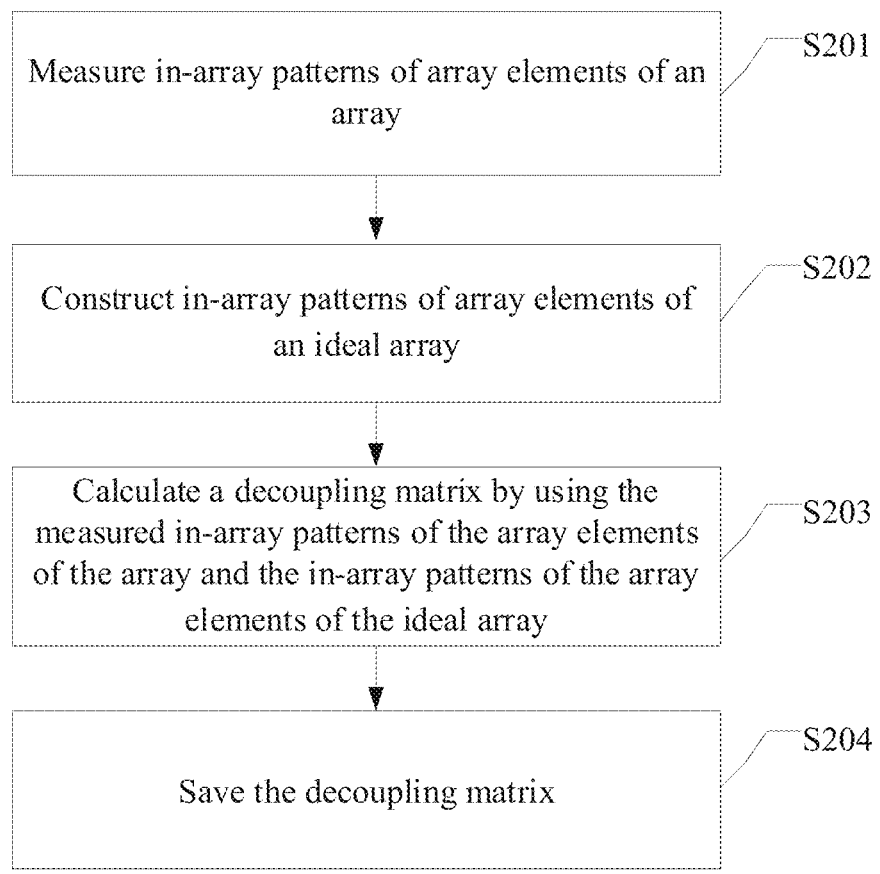
FIG. 2 is a flowchart of constructing a decoupling matrix according to an embodiment of the present disclosure.

Next, a construction process of the decoupling matrix at a certain frequency point according to an example embodiment of the present disclosure will be described in detail with reference to FIG. 2. FIG. 2 is a flowchart of constructing a decoupling matrix according to an embodiment of the present disclosure. As shown in FIG. 2, the construction process of the decoupling matrix may specifically include the following steps.

At S201, in-array patterns of array elements of an array are measured.

In step S201, the in-array patterns of the individual array elements of the antenna array are measured separately, for example: $F'=[F_1', F_2', \ldots F_M']$, where $F_1', F_2', \ldots F_M'$ represent the in-array patterns of the array elements, respectively, and the in-array pattern of one array element represents an in-array pattern measured when only this one array element is excited and no other array element is excited in the array. The measured in-array patterns of the array elements in the antenna array can be expressed as an in-array pattern matrix shown in the following equation (1).

$$F' = \begin{bmatrix} F_1'(\varphi_1, \theta_1) & F_2'(\varphi_1, \theta_1) & \ldots & F_M'(\varphi_1, \theta_1) \\ F_1'(\varphi_2, \theta_2) & F_2'(\varphi_2, \theta_2) & \ldots & F_M'(\varphi_2, \theta_2) \\ \vdots & \vdots & \ddots & \vdots \\ F_1'(\varphi_N, \theta_N) & F_2'(\varphi_N, \theta_N) & \ldots & F_M'(\varphi_N, \theta_N) \end{bmatrix} \quad (1)$$

In the above equation (1), N is the number of spatial sampling points for the pattern, each column represents an in-array pattern of one array element of the antenna array actually detected or actually measured at each of the N spatial sampling points, φ and θ in the in-array pattern of each sampling point represent the incident azimuth and pitch angles of a signal at the sampling point respectively, M is the number of the array elements in the antenna array, and M is an integer greater than or equal to 2.

At S202, in-array patterns of array elements of an ideal array are constructed.

In step S202, the in-array patterns of the array elements in the ideal array are calculated according to an array arrangement. The in-array patterns of the array elements in the ideal array are composed into an in-array pattern matrix $F^d$, as shown in the following equation (2).

$$F^d = \begin{bmatrix} F_1^d(\varphi_1, \theta_1) & F_2^d(\varphi_1, \theta_1) & \ldots & F_M^d(\varphi_1, \theta_1) \\ F_1^d(\varphi_2, \theta_2) & F_2^d(\varphi_2, \theta_2) & \ldots & F_M^d(\varphi_2, \theta_2) \\ \vdots & \vdots & \ddots & \vdots \\ F_1^d(\varphi_N, \theta_N) & F_2^d(\varphi_N, \theta_N) & \ldots & F_M^d(\varphi_N, \theta_N) \end{bmatrix} \quad (2)$$

In the above equation (2), N is the number of spatial sampling points for the pattern, each column represents an in-array pattern of one array element of the constructed ideal antenna array at each of the N spatial sampling points, φ and θ in the in-array pattern of each sampling point represent the incident azimuth and pitch angles of a signal at the sampling point, respectively, M is the number of the array elements in the antenna array, and M is an integer greater than or equal to 2.

At S203, a decoupling matrix is calculated by using the measured in-array patterns of the array elements of the array and the in-array patterns of the array elements of the ideal array.

In step S203, the following equation (3) is established according to a relationship between the in-array pattern matrix F' of the coupled array, the in-array pattern matrix $F^d$ of the ideal array and the decoupling matrix D.

$$F' * D = \begin{bmatrix} F'_1(\varphi_1, \theta_1) & F'_2(\varphi_1, \theta_1) & \ldots & F'_N(\varphi_1, \theta_1) \\ F'_1(\varphi_2, \theta_2) & F'_2(\varphi_2, \theta_2) & \ldots & F'_N(\varphi_2, \theta_2) \\ \vdots & \vdots & \ddots & \vdots \\ F'_1(\varphi_M, \theta_M) & F'_2(\varphi_M, \theta_M) & \ldots & F'_N(\varphi_M, \theta_M) \end{bmatrix} \begin{bmatrix} d_{11} & d_{12} & \ldots & d_{1N} \\ d_{21} & d_{22} & \ldots & d_{2N} \\ \vdots & \vdots & \ddots & \vdots \\ d_{N1} & d_{N2} & \ldots & c_{NN} \end{bmatrix} \quad (3)$$

$$= \begin{bmatrix} F^d_1(\varphi_1, \theta_1) & F^d_2(\varphi_1, \theta_1) & \ldots & F^d_N(\varphi_1, \theta_1) \\ F^d_1(\varphi_2, \theta_2) & F^d_2(\varphi_2, \theta_2) & \ldots & F^d_N(\varphi_2, \theta_2) \\ \vdots & \vdots & \ddots & \vdots \\ F^d_1(\varphi_M, \theta_M) & F^d_2(\varphi_M, \theta_M) & \ldots & F^d_N(\varphi_M, \theta_M) \end{bmatrix}$$

$$= F^d$$

The decoupling matrix obtained by solving the above equation (3) is shown in the following equation (4).

$$D = pinv(F') * F^d \quad (4)$$

$$= \begin{bmatrix} F'_1(\varphi_1, \theta_1) & F'_2(\varphi_1, \theta_1) & \ldots & F'_N(\varphi_1, \theta_1) \\ F'_1(\varphi_2, \theta_2) & F'_2(\varphi_2, \theta_2) & \ldots & F'_N(\varphi_2, \theta_2) \\ \vdots & \vdots & \ddots & \vdots \\ F'_1(\varphi_M, \theta_M) & F'_2(\varphi_M, \theta_M) & \ldots & F'_N(\varphi_M, \theta_M) \end{bmatrix}^{-1} \begin{bmatrix} F^d_1(\varphi_1, \theta_1) & F^d_2(\varphi_1, \theta_1) & \ldots & F^d_N(\varphi_1, \theta_1) \\ F^d_1(\varphi_2, \theta_2) & F^d_2(\varphi_2, \theta_2) & \ldots & F^d_N(\varphi_2, \theta_2) \\ \vdots & \vdots & \ddots & \vdots \\ F^d_1(\varphi_M, \theta_M) & F^d_2(\varphi_M, \theta_M) & \ldots & F^d_N(\varphi_M, \theta_M) \end{bmatrix}$$

In the above equation (4), pinv(F') means to obtain a generalized inverse of the matrix F', and the elements in the decoupling matrix D are the decoupling factors.

At S204, the decoupling matrix is saved.

In step S204, elements in the decoupling matrix D that has been solved for can be saved in a designated storage area, to facilitate subsequent decoupling of the multiple array elements in the antenna array.

In an embodiment of the present disclosure, by combining the in-array pattern matrix and the ideal array, the decoupling matrix of the array is solved for, so that antenna decoupling can be realized without changing antenna hardware. This method can effectively reduce the design pressure by sparing small array design from hardware decoupling.

Figure 3:
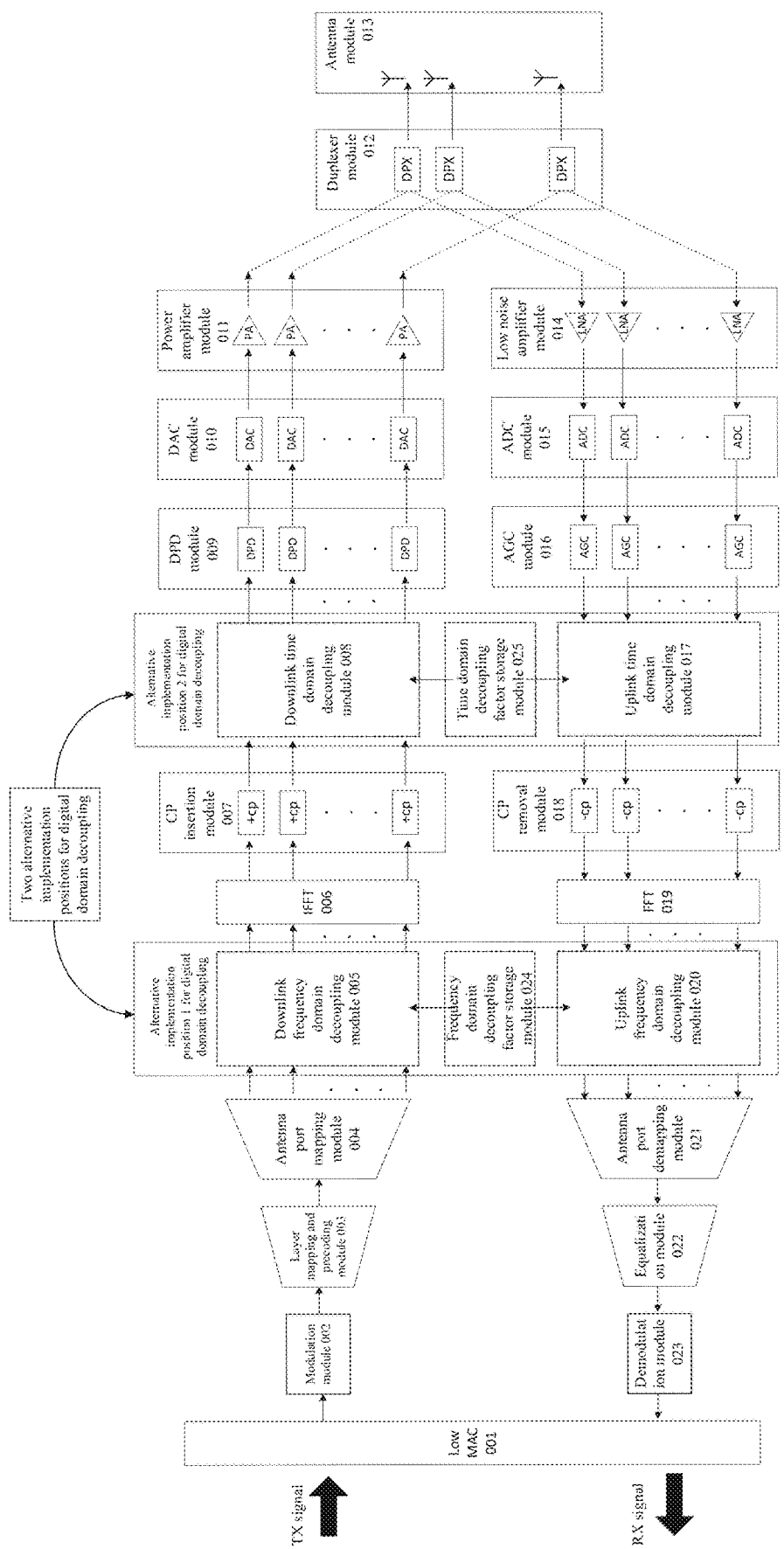
FIG. 3 is a schematic diagram of an architecture of a digital domain decoupling scheme of an antenna array according to an example embodiment of the present disclosure.

In an embodiment of the present disclosure, in step S110, the received predetermined digital domain signals of the plurality of channels may be uplink or downlink frequency domain signals or uplink or downlink time domain signals. FIG. 3 is a schematic diagram of an architecture of a digital domain decoupling scheme of an antenna array according to an example embodiment of the present disclosure. FIG. 3 depicts two alternative implementation positions for antenna array decoupling in digital domain, namely the positions of a decoupling module in a base station system.

As shown by "alternative implementation position 1 for digital domain decoupling" in FIG. 3, the decoupling factors can be used in a frequency domain module of the base station system, which is called a frequency domain decoupling scheme.

As shown by a downlink frequency domain decoupling apparatus 005 and an uplink frequency domain decoupling module 020 in FIG. 3, the downlink frequency domain decoupling apparatus 005 may be located between an antenna port mapping module 004 and an inverse fast Fourier transform (IFFT) module 006, and the uplink frequency domain decoupling module 020 may be located between a fast Fourier transform (FFT) module 019 and an antenna port demapping module 021.

In an embodiment, the antenna port mapping module 004 can be configured to map received downlink frequency domain signals of the plurality of channels to multiple antenna ports, the downlink frequency domain decoupling apparatus 005 decouples the frequency domain signals of the plurality of channels received from the antenna port mapping module 004, and the IFFT 006 can be configured to convert the decoupled frequency domain signals of the plurality of channels into time domain signals.

In an embodiment, the FFT module 019 can be configured to convert received uplink time domain signals of the plurality of channels into frequency domain signals, the uplink frequency domain decoupling module 020 decouples the frequency domain signals of the plurality of channels received from the FFT module 019, and the antenna port demapping module 021 is configured to demap the decoupled frequency domain signals of the plurality of channels of the FFT module 019 from physical ports.

In other words, in this embodiment, when the predetermined digital domain signals are frequency domain signals, the frequency domain signals include downlink frequency domain signals mapped via antenna ports or uplink frequency domain signals before being demapped via the antenna ports.

As shown by "alternative implementation position 2 for digital domain decoupling" in FIG. 3, the decoupling factors can be used in a time domain module of the base station system, which is called a time domain decoupling scheme.

As shown with a downlink time domain decoupling module 008 and an uplink time domain decoupling module 017 in FIG. 3, the downlink time domain decoupling module 008 can be located between a cyclic prefix (CP) insertion module 007 and a deep power down (DPD) module 009, and the uplink time domain decoupling module 017 can be located between an automatic gain control (AGC) module 016 and a CP removal module 018.

In an embodiment, the CP insertion module 007 is configured to add cyclic prefixes to received time domain signals of the plurality of channels, so as to realize time pre-estimation and frequency synchronization, the downlink time domain decoupling module 008 is configured to decouple the time domain signals of the plurality of channels with the cyclic prefixes added, and the DPD module 009 is configured to reduce nonlinear distortion of the channels.

In an embodiment, the AGC module 016 is configured to adjust gains of the received uplink time domain signals of the plurality of channels, the uplink time domain decoupling module 017 is configured to decouple the uplink time domain signals of the plurality of channels after gain adjustment, and the CP removal module 018 is configured to remove the cyclic prefixes from the decoupled uplink time domain signals of the plurality of channels.

In other words, in this embodiment, when the predetermined digital domain signals are time domain signals, the time domain signals include downlink time domain signals with cyclic prefixes inserted or uplink time domain signals before the cyclic prefixes are removed.

FIG. 3 also shows other main modules in an uplink and a downlink of the base station system. For example, after being processed by a signal modulation module 002, a layer mapping and precoding module 003, a digital-to-analog converter (DAC) module 010 and a power amplifier module 011 in sequence, transmission signals (TX signals) of the downlink reach an antenna module 013 through a duplexer module 012; and signals received by the antenna module 013 in the uplink are transmitted by the duplexer module 012, and then pass through a low noise amplifier module 014, an analog-to-digital converter (ADC) module 015, an equalization module 022 and a demodulation module 023.

For example, the transmission signals (TX signals) of the downlink are processed correspondingly by a low media access control (MAC) module 001 (for example, shielding a low hardware platform and encapsulating physical link operation), and then by the modules in the downlink in FIG. 3, and then reaches the antenna module 013 through the duplexer (DPX) module 012; and the signals received by the antenna module 013 are transmitted by the duplexer module 012 and processed by the functional modules in the uplink and the low MAC module 001, so as to obtain uplink received signals (RX signals).

It should be understood that the main modules in the base station system of the present disclosure are not limited to the specific modules described above and shown in FIG. 3. In some embodiments, the architecture can only contain some of the modules, that is, the architecture of the base station system can have a more flexible module configuration. Implementation apparatuses of two decoupling schemes of the present disclosure are introduced below.

Figure 4:
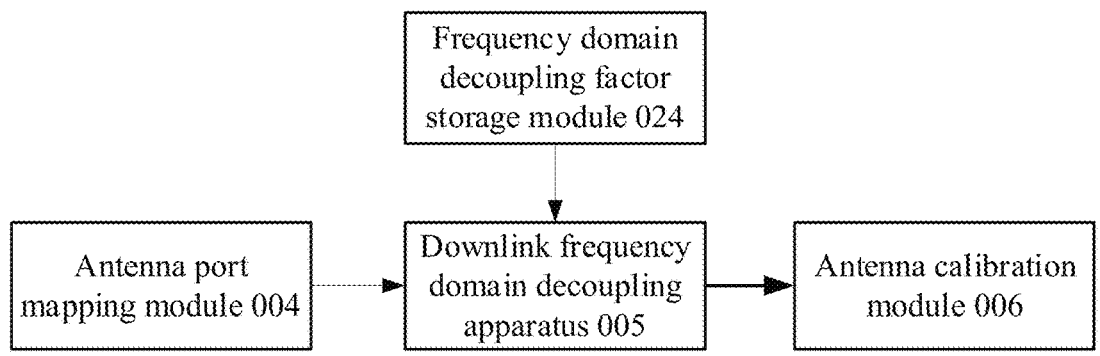
FIG. 4 is a block diagram showing a specific implementation position of a downlink frequency domain decoupling scheme according to an embodiment.
Figure 5:
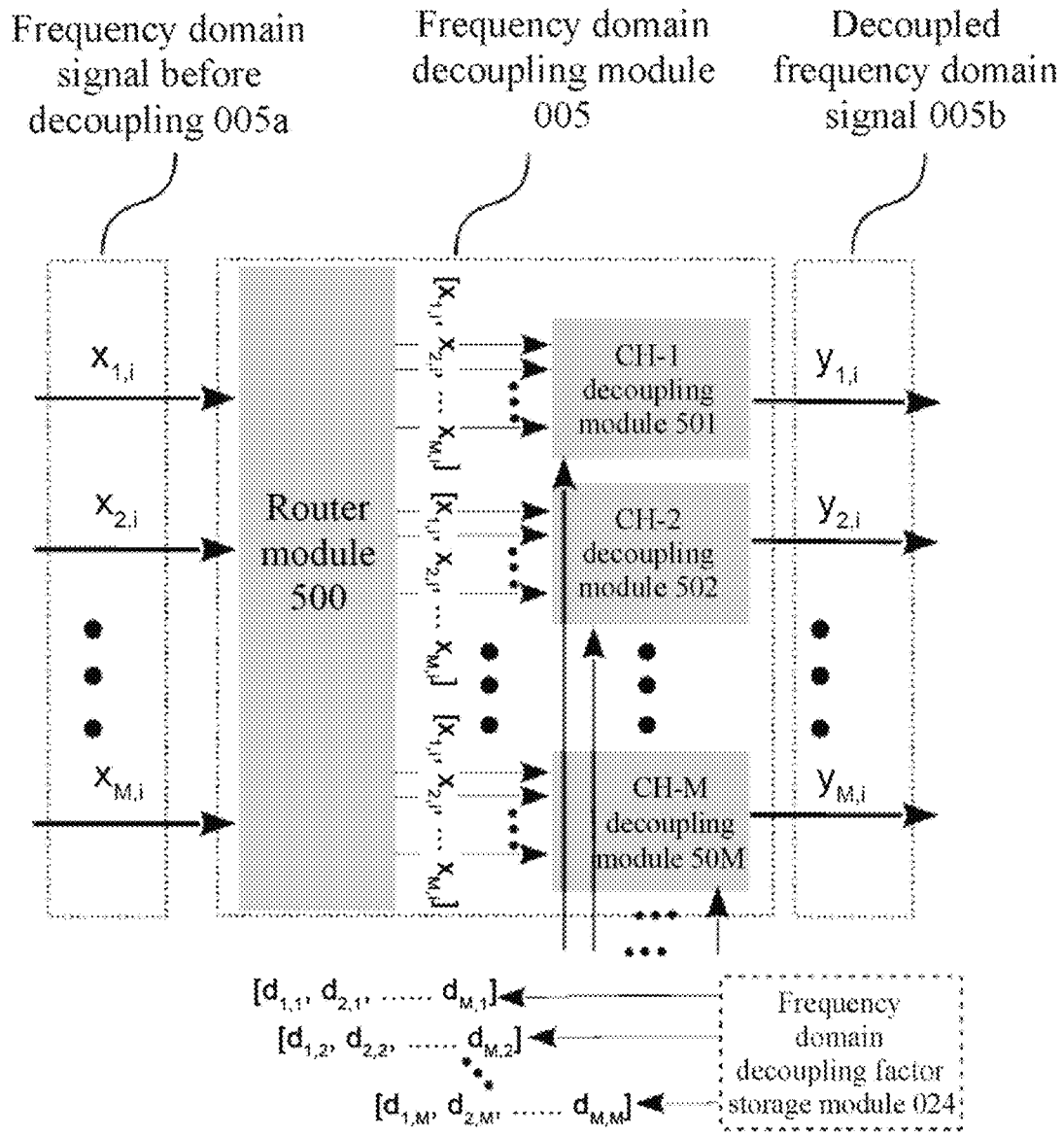
FIG. 5 is a schematic diagram of decoupling modules in a frequency domain decoupling scheme according to an embodiment.

FIG. 4 is a block diagram showing a specific implementation position of a downlink frequency domain decoupling scheme according to an embodiment. FIG. 5 is a schematic diagram of decoupling modules in a frequency domain decoupling scheme according to an embodiment. The same reference numerals are used for the same or equivalent elements in FIGS. 4 and 5 as those in FIG. 3.

As shown in FIG. 4, a frequency domain decoupling scheme of the present disclosure can be implemented in baseband in the frequency domain. That is, the downlink frequency domain decoupling apparatus 005 can be specifically located between the antenna port mapping module 004 and an antenna calibration module 006. The downlink frequency domain decoupling apparatus 005 decouples the received coupled multi-channel data by loading decoupling factors in a frequency domain decoupling factor storage module 024.

As shown in FIG. 5, the downlink frequency domain decoupling apparatus 005 can specifically include: a router module 500, multiple channel decoupling modules such as a CH-1 decoupling module 501, a CH-2 decoupling module 502, . . . , a CH-M decoupling module 50M, M being the number of the antenna channels.

It should be noted that the uplink frequency domain decoupling apparatus 020 and the downlink frequency domain decoupling apparatus 005 have the same or equivalent structure. To simplify the description, the following embodiments illustrate the frequency domain signal decoupling scheme by taking the downlink frequency domain decoupling apparatus 005 as an example, and the decoupling scheme of uplink frequency domain signals is consistent with that of downlink frequency domain signals.

In FIG. 5, input signals 005a are input signals of the frequency domain decoupling modules, and in FIG. 5, they can represent signals after mapping of downlink antenna ports. In the case of the uplink, they can be signals after passing the antenna calibration module 006 or signals before demapping of uplink antenna ports. Output signals 005b are output signals of the frequency domain decoupling module.

With continued reference to FIG. 5, the router module 500 can be configured to allocate the input signals of the channels to the decoupling modules of the channels for decoupling.

The router module 500 shown in FIG. 5 allocates all channel data to the decoupling modules of the channels. However, it is generally believed that antenna elements only have strong coupling with surrounding antennas, and to save resources, coupling with other antenna elements can be neglected.

In an embodiment, the channels involved in decoupling are a specified number of channels located around the channel in question which are determined beforehand according to the array arrangement of the antenna array.

Before step S120, the following step may be executed: a specified number of channels located around each channel are determined beforehand according to the array arrangement of the antenna array as the channels involved in decoupling.

As an example, for array antennas arranged into a rectangle, there are 8 antenna elements around an antenna element in question in the array, so together with the antenna element in question, data of 9 channels need to be involved for decoupling the antenna element in question. The function of the router module is to allocate relevant channel data to the channels corresponding to the array elements for the decoupling module of the channel in question to perform decoupling.

Each of the plurality of decoupling modules 501-50M corresponds to a channel decoupling module. Each channel combines the channel data allocated by the router module with the loaded decoupling factors transmitted by the frequency domain decoupling factor storage module 024 to output decoupled signals of the channel.

The frequency domain decoupling factor storage module 024 can be configured to store frequency domain decoupling factors, which exist in the form of decoupling matrices at several frequency points. As the decoupling factors change with frequency, multiple decoupling matrices at different frequency points can be stored.

In an embodiment, in the above step S120, determining decoupling factors of channels involved in decoupling corresponding to each channel may specifically include: S121, determining frequency points of predetermined digital domain signals of each channel; and S122, determining the decoupling factors of the channels involved in decoupling corresponding to each channel according to the frequency points.

In step S122, firstly, the decoupling factors of the array elements in the antenna array at the frequency point can be obtained; secondly, the decoupling factors of the array elements at the frequency point are taken as the decoupling factors of the channels corresponding to the array elements at the frequency point; and then, the decoupling factors of the channels involved in decoupling corresponding to each channel are obtained from the channels involved in decoupling corresponding to each channel.

In this embodiment, corresponding decoupling matrices can be selected in the frequency domain decoupling factor storage module 024 according to frequency points of currently received channel data.

In an embodiment, when the predetermined digital domain signals are frequency domain signals, the above step S130 may specifically include: S31, weighting the frequency domain signals of the channels involved in decoupling corresponding to each channel by using the decoupling factors corresponding to the determined channels involved in decoupling, so as to obtain weighted frequency domain signals of the channels involved in decoupling corresponding to each channel; and S32, combining the weighted frequency domain signals of the channels involved in decoupling corresponding to each channel to obtain a decoupled frequency domain signal of each channel.

For example, decoupling channel data in the frequency domain can be realized by the following equation (5).

$$Y_i = \begin{bmatrix} y_{1,i} \\ y_{2,i} \\ \vdots \\ y_{m,i} \end{bmatrix}$$

$$= D_i X_i$$

$$= \begin{bmatrix} d_{1,1} & d_{1,2} & \cdots & d_{1,m} \\ d_{2,1} & d_{2,2} & \cdots & d_{2,m} \\ \vdots & \vdots & \ddots & \vdots \\ d_{m,1} & d_{m,2} & \cdots & d_{m,m} \end{bmatrix} \begin{bmatrix} x_{1,i} \\ x_{2,i} \\ \vdots \\ x_{m,i} \end{bmatrix}$$

$$= \begin{bmatrix} d_{1,1}x_{1,i} + d_{1,2}x_{2,i} + d_{1,3}x_{3,i} + \ldots d_{1,m}x_{m,i} \\ d_{2,1}x_{1,i} + d_{2,2}x_{2,i} + d_{2,3}x_{3,i} + \ldots d_{2,m}x_{m,i} \\ \vdots \\ d_{m,1}x_{1,i} + d_{m,2}x_{2,i} + d_{m,3}x_{3,i} + \ldots d_{m,m}x_{m,i} \end{bmatrix}$$

In the above equation (5), $D_i$ refers to a decoupling matrix at a frequency point of an $i^{th}$ resource block (RB). Here, an RB is the smallest unit of data transmission resources that can be allocated. One RB is defined as 12 consecutive sub-carriers in frequency domain and one slot in time domain.

That is, $D_i$ is the corresponding decoupling matrix selected in the frequency domain decoupling factor storage module 024 according to the frequency points of the currently received channel data, and a data stream vector $X_i$ refers to a data stream output downward from the antenna port mapping module downstream at the $i^{th}$ RB frequency point, or a data stream after the antenna calibration module 006, or a data stream before demapping of the uplink antenna ports, which corresponds to the frequency domain signals 005a before decoupling in FIG. 5; and a data stream vector $Y_i$ refers to an RB data stream output by the decoupling module, which corresponds to the frequency domain signals 005b after decoupling in FIG. 5.

In an embodiment of the present disclosure, the decoupling matrix $D_i$ in equation (5) is an M*M matrix (M is the number of antennas in the array). In order to save resources, when decoupling the channel data of one particular antenna element, elements in the decoupling matrix corresponding to antenna elements weakly coupled to the one particular antenna element can be set to zero; and generally, only the decoupling factors of the specified number of antenna elements located around the one particular antenna element are kept, for example, in the router module 500, channels not located around the antenna element will not be routed to an input terminal device of the corresponding decoupling channel of the one particular antenna element.

That is, data channels involved in the decoupling of a certain channel are a specified number of channels around the certain channel which are determined beforehand according to the array arrangement of the antenna array. Therefore, when introducing the decoupling matrix of the channel according to the frequency point, only the preset corresponding decoupling factors, in the decoupling matrix, of the data channels involved in the decoupling of the channel need to be involved.

Figure 6:
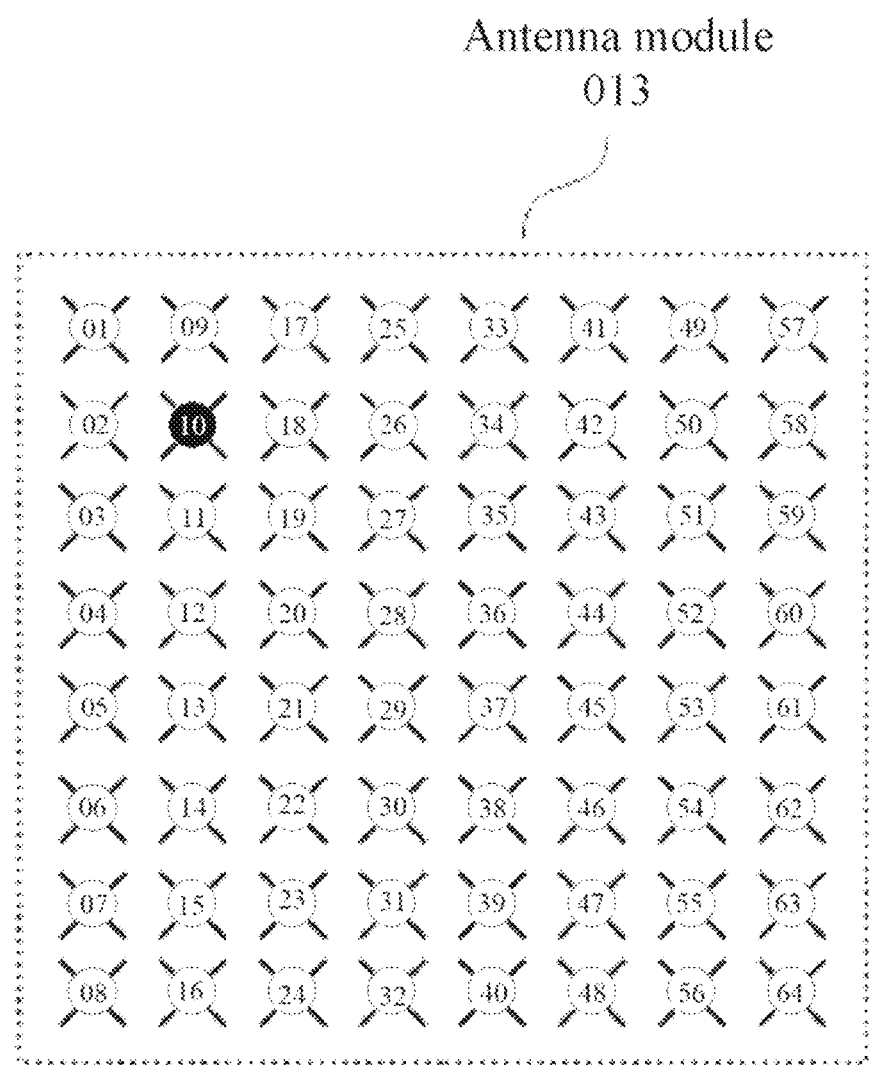
FIG. 6 is a schematic diagram showing base station antennas as a 64-element rectangular two-dimensional array.
Figure 7:
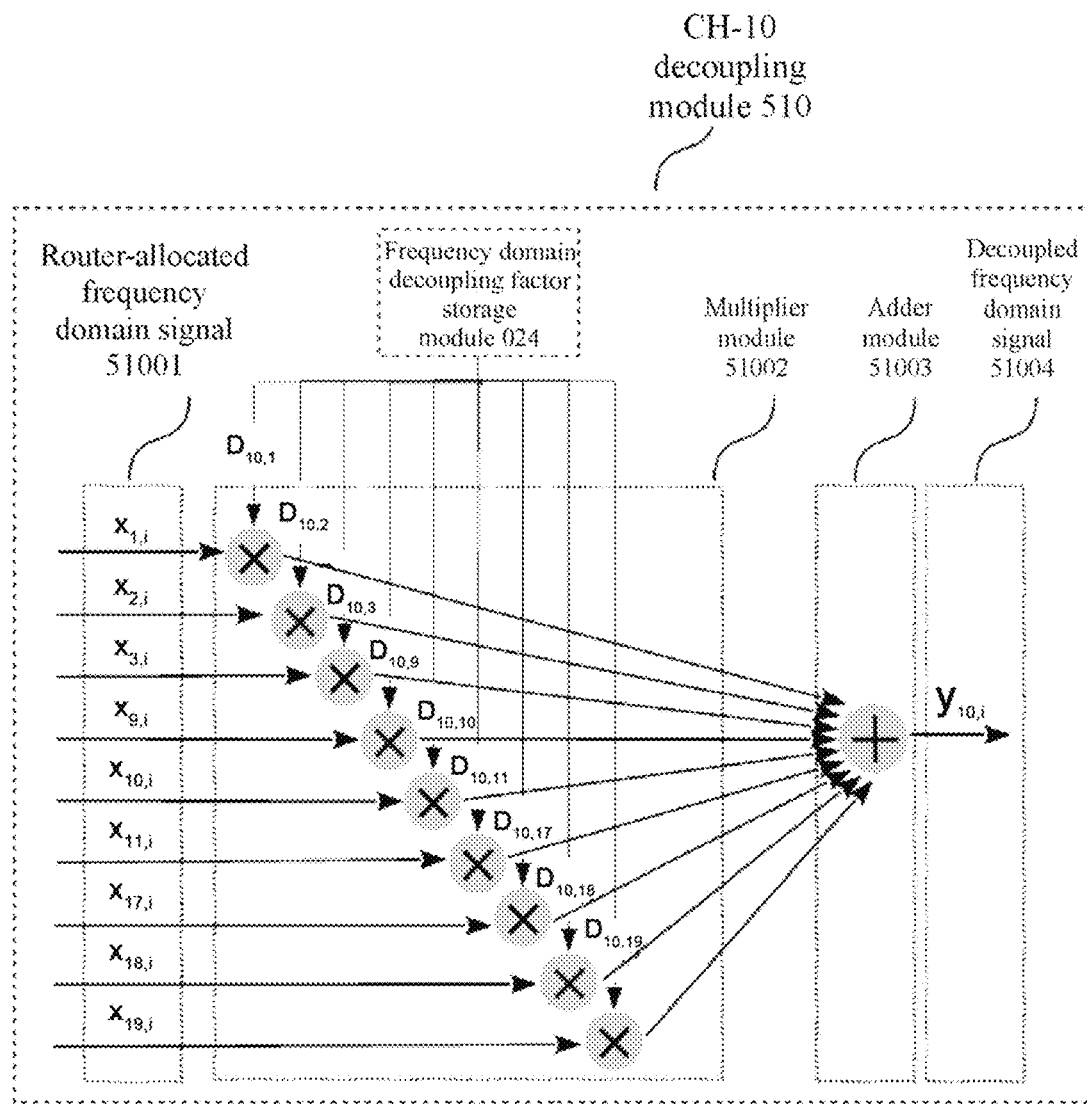
FIG. 7 is a schematic diagram of a decoupling module 510 corresponding to Channel 10 in a frequency domain decoupling scheme.

To facilitate understanding, the specific process of decoupling one particular channel of the plurality of channels will be described with reference to FIGS. 6 and 7. FIG. 6 is a schematic diagram showing base station antennas as a 64-element rectangular two-dimensional array. FIG. 7 is a schematic diagram of a decoupling module 510 corresponding to Channel 10 in a frequency domain decoupling scheme. The same reference numerals are used for the same or equivalent structures in FIGS. 6 and 7 as those in FIGS. 4 and 5.

As shown in FIG. 6, it is assumed that base station antennas are arranged as a 64-element rectangular two-dimensional array. Array elements around array element 10 are array element 1, array element 2, array element 3, array element 9, array element 11, array element 17, array element 18 and array element 19, so there are 9 coupling-related array elements in total including array element 10 itself.

Therefore, when Channel 10 is to be decoupled, the channel data corresponding to the nine array elements need to be involved. The channel data corresponding to the nine array elements are multiplied by the decoupling factors corresponding to Channel 10 at the RB frequency point respectively, and then combined and output.

As shown in FIG. 7, the frequency domain signals 51001 for routing allocation are RB input signals of the channels involved in decoupling allocated by the router module 500 for the decoupling module 510 corresponding to Channel 10 (CH-10) at the $i^{th}$ frequency point, and input signals of the channels involved in the decoupling of the CH-10 are $x_{1,i}$, $x_{2,i}$, $x_{3,i}$, $x_{9,i}$, $x_{10,i}$, $x_{11,i}$, $x_{17,i}$, $x_{18,i}$, $x_{19,i}$, respectively.

A multiplier module 51002 is configured to multiply the input signals of the channels involved in decoupling by corresponding decoupling factor values.

An adder module 51003 is configured to combine the input signals of the channels involved in decoupling with signals after being weighted (multiplied) by the decoupling factors.

A decoupled frequency domain signal module 51004 is configured to output decoupled frequency domain signals of Channel 10.

In an embodiment, the implementation process of the multiplier module 51002 and the adder module 51003 can be expressed by the following equation (6).

$$y_{10,i} = d_{10,1}x_{1,i} + d_{10,2}x_{2,i} + d_{10,3}x_{3,i} + d_{10,9}x_{9,i} + d_{10,10}x_{10,i} + d_{10,11}x_{11,i} + d_{10,17}x_{17,i} + d_{10,18}x_{18,i} + d_{10,19}x_{19,i} \quad (6)$$

In the above equation (6), i represents the $i^{th}$ RB data being processed at this moment, and $y_{10,i}$ is an output value of the decoupling module of Channel 10.

Here, $x_{1,i}$, $x_{2,i}$, $x_{3,i}$, $x_{9,i}$, $x_{10,i}$, $x_{11,i}$, $x_{17,i}$, $x_{18,i}$, $x_{19,i}$ represent input data of Channel 1, Channel 2, Channel 3, Channel 9, Channel 10, Channel 11, Channel 17, Channel 18 and Channel 19, respectively. Each channel goes through the above decoupling process of Channel 10 in turn, and outputs output values after decoupling, thus realizing the decoupling operation of antenna array.

Figure 8:
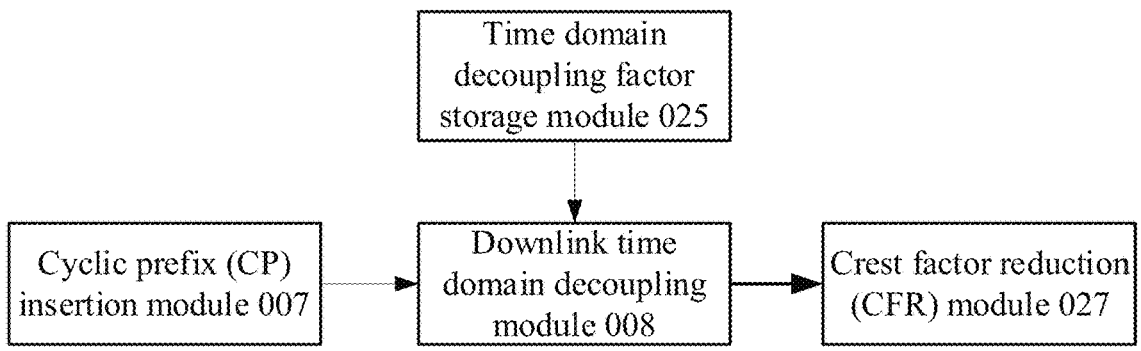
FIG. 8 is a block diagram showing a specific implementation position of a downlink time domain decoupling scheme according to an embodiment.
Figure 9:
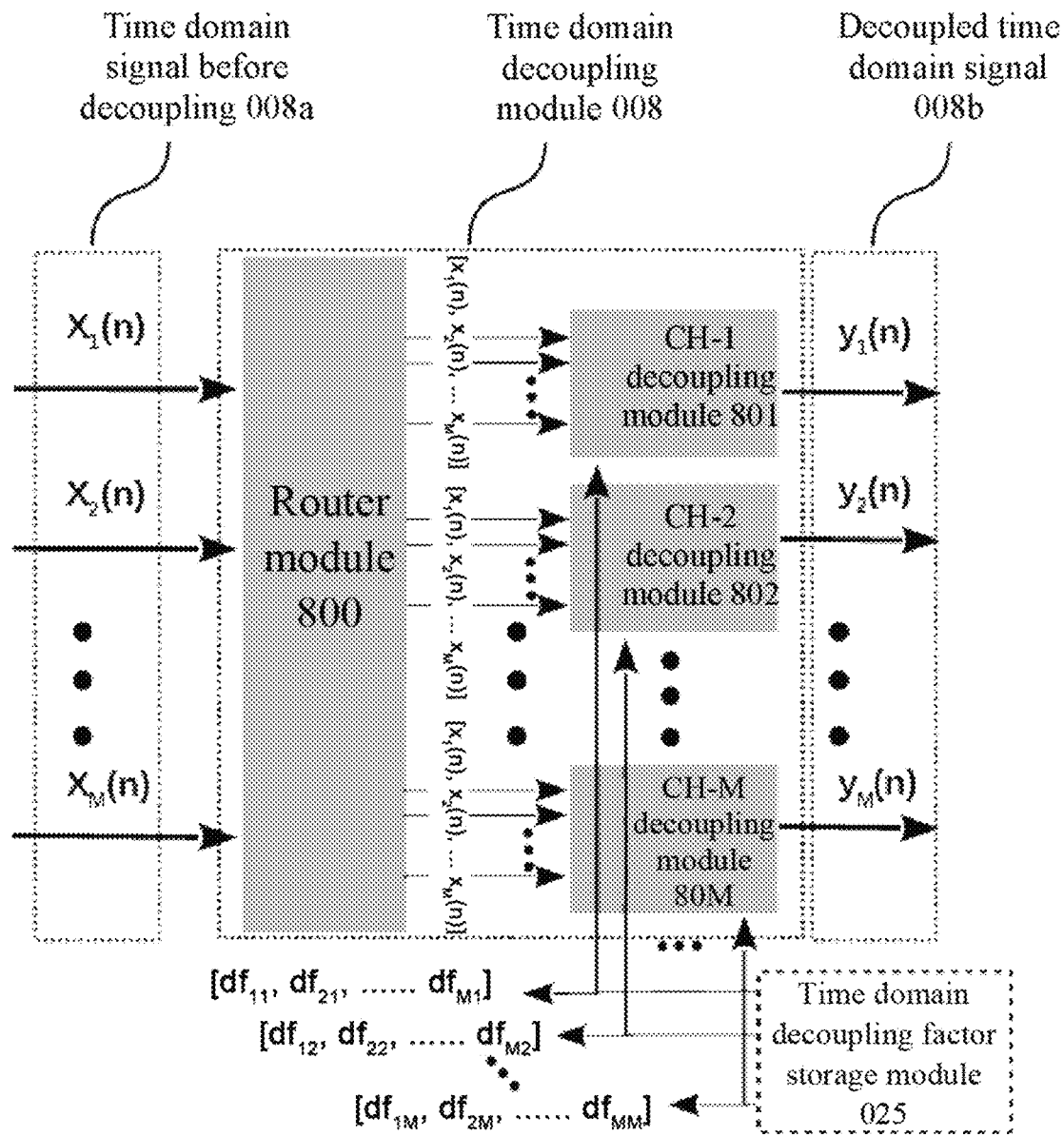
FIG. 9 is a schematic diagram of decoupling modules in a time domain decoupling scheme according to an embodiment.

FIG. 8 is a block diagram showing a specific implementation position of a downlink time domain decoupling scheme according to an embodiment. FIG. 9 is a schematic diagram of decoupling modules in a time domain decoupling scheme according to an embodiment. The same reference numerals are used for the same or equivalent elements in FIGS. 8 and 9 as those in FIG. 3.

As shown in FIG. 8, a time domain decoupling scheme of the present disclosure can be implemented at an intermediate frequency or in baseband. The downlink time domain decoupling apparatus 008 may specifically be located between the CP insertion module 007 and a crest factor reduction (CFR) module 027, and the uplink time domain decoupling apparatus 017 may be located between the CFR module 027 and the CP removal module 018.

As shown in FIG. 9, in an embodiment, the time domain decoupling module apparatus 008 may include: a router module 800, multiple channel decoupling modules such as a CH-1 decoupling module 801, a CH-2 decoupling module 802, . . . , a CH-M decoupling module 80M, M being the number of the antenna channels.

It should be noted that the uplink time domain decoupling apparatus 017 and the downlink time domain decoupling apparatus 008 have the same or equivalent structure. To simplify the description, the following embodiments illustrate the time domain signal decoupling scheme by taking the downlink time domain decoupling apparatus 008 as an example, and the decoupling scheme of uplink time domain signals is consistent with that of downlink time domain signals.

In FIG. 9, input signals 008a are input signals of the time domain decoupling module, and in FIG. 9, they can represent signals after the CP insertion module in the downlink, or signals after the CFR module or signals before CP removal in the uplink. Output signals 008b are output signals of the time domain decoupling module.

With continued reference to FIG. 9, the router module 800 can be configured to allocate the input signals of the channels to the decoupling modules of the channels for decoupling.

The router module 800 shown in FIG. 9 can allocate all channel data to the decoupling modules of the channels, but in practical application, in order to save resources, only channel signals corresponding to array elements having a strong coupling relationship with a certain array element are involved generally for decoupling. Array elements strongly coupled to a respective one of array elements can be a specified number of array elements located around the respective one of array elements. Therefore, in this case, when the router module allocates input signals to the channel decoupling modules corresponding to a certain array element, it only needs to allocate the input signals of the channels of the array elements around the array element to the decoupling modules of the array element.

It should be further noted that the number of edge array elements is relatively small compared with neighboring array elements in the array, so the number of input signals allocated by the router module to the decoupling modules of different channels varies.

Each of the plurality of decoupling modules, for example, 801-80M, corresponds to a channel. Each channel combines the channel input data allocated by the router module with the loaded decoupling factors transmitted by the time domain decoupling factor storage module 025 to output decoupled signals of the channel. In the embodiment of the present disclosure, due to the fact that signals transmitted by mobile communication are broadband signals, decoupling factor loading of the signals here is realized by convolutional filtering.

The time domain decoupling factor storage module 025 can be configured to store time domain decoupling filter factors DF. The factors are expressed in the form of an M*M (M is the number of antenna elements of base station) matrix for convenience of description, but the matrix element df_(i, j) is not a simple constant, but a set of filter factors described by the following equation (7).

$$df_{i,j} = [\text{fir}_1^{ij}, \text{fir}_2^{ij}, \ldots \text{fir}_K^{ij}] \quad (7)$$

In the above equation (7), $\text{fir}_1^{ij}$, $\text{fir}_2^{ij}$, . . . , $\text{fir}_K^{ij}$ is a set of filter tap factors, and K in the equation (7) represents the filter order. The value of K can be determined according to the bandwidth requirements or empirical value in an actual application scenario. As an example, according to verification results, K taking the value 3 can meet the conventional bandwidth requirements.

In FIG. 9, the time domain decoupling factor storage module 025 can allocate all corresponding decoupling filter factors to the decoupling modules (for example, 801-80M) of the channels. However, in order to save resources, the nearest surrounding array elements will be decoupled in the channel decoupling modules (801-80M), so the time domain decoupling factor storage module 025 only needs to transmit the filter factors corresponding to the nearest surrounding array elements. Here, the nearest surrounding array elements of one particular array element refer to a predetermined number of array elements in the antenna array located around the one particular array element.

In an embodiment, when the predetermined digital domain signals are time domain signals, the above step S130 may specifically include:

S41: determining filter factors of a decoupling filter corresponding to each channel, the filter factors being factors in the time domain corresponding to the decoupling factors of the channels involved in decoupling corresponding to each channel at different frequency points;

S42: conducting convolutional filtering on the time domain signals of the channels involved in decoupling corresponding to each channel according to the filter factors of the decoupling filters corresponding to the determined channels involved in decoupling, so as to obtain time domain signals after the convolutional filtering of the channels involved in decoupling corresponding to each channel;

S43: combining the time domain signals, obtained after convolutional filtering, of the channels involved in decoupling corresponding to each channel to obtain a decoupled time domain signal of each channel.

In an embodiment, the step S42 may specifically include the following sub-steps:

S4201: conducting filter weighting once on time domain signals for the $i^{th}$ channel by using the filter factors of the decoupling filters corresponding to the channels involved in decoupling corresponding to the $i^{th}$ channel, so as to obtain time domain signals after convolutional filtering for the $i^{th}$ channel, the channels involved in decoupling in this step being data channels involved in the decoupling of the $i^{th}$ channel;

S4202: repeating the filter weighting on the time domain signals for the $i^{th}$ channel after convolutional filtering at regular intervals of a predetermined time delay, until the number of times of filter weighting reaches a predetermined number of times, so as to obtain time domain signals for the $i^{th}$ channel after the predetermined number of times of filter weighting;

S4203: combining the time domain signals for the $i^{th}$ channel after the predetermined number of times of filter weighting to obtain time domain signals after convolutional filtering of the channels involved in decoupling corresponding to the $i^{th}$ channel.

In this embodiment, the $i^{th}$ channel is any channel of the plurality of channels, i is an integer greater than or equal to 1, and i is less than or equal to the total number of the channels; and the predetermined number of times is a number determined according to a filter order or a number of taps of the corresponding decoupling filter.

In an embodiment of the present disclosure, for each of the plurality of channels, the decoupling filters corresponding to the data channels involved in the decoupling of each channel can be finite impulse response (FIR) filters with linear delay, and if the order of the corresponding FIR filter is provided as T, the FIR filter has T+1 taps, where T is an integer greater than or equal to 1.

In the above step S43, the predetermined time delay may be a time delay value calculated according to the number of taps of the corresponding filter or the order of the corresponding filter, or may be a user-defined time delay value. In addition, in the embodiment of the present disclosure, the orders or the number of taps of the filters corresponding to the data channels involved in decoupling may be the same or different, and may be preset by a user according to the filtering requirements in an actual application scenario.

According to the description of the above embodiments, in order to reduce the distortion of time domain signals after decoupling, it may be necessary to combine a time domain signal of each channel decoupled at a first time and the time domain signal decoupled again at regular intervals of a predetermined time delay, and the final time domain signal of each channel obtained through the combination are taken as the decoupled time domain signal of each channel.

For example, decoupling channel data in the time domain can be realized by the following equation (8).

$$y_j(n) = \sum_{m=1}^{M} x_m(n) * df_{jm}(n) \quad (i = 1 \ldots M) \tag{8}$$

In the above equation (8), $y_j(n)$ is output data of a $j^{th}$ decoupling channel, $x_1(n), x_2(n), \ldots, x_m(n)$ is M channel data related to the channel j (including j channel itself), M is the number of antenna elements in the antenna array, and the symbol * indicates the signal convolution operation.

According to the description of the above embodiments, considering resource saving and the actual situation of antenna coupling, that is, an antenna element is generally only strongly coupled to its nearest surrounding array elements, the router module 800 generally only allocates channel signals corresponding to the surrounding array elements of the array element in question during decoupling, where the nearest surrounding array elements are a predetermined number of antenna elements around this antenna element.

Figure 10:
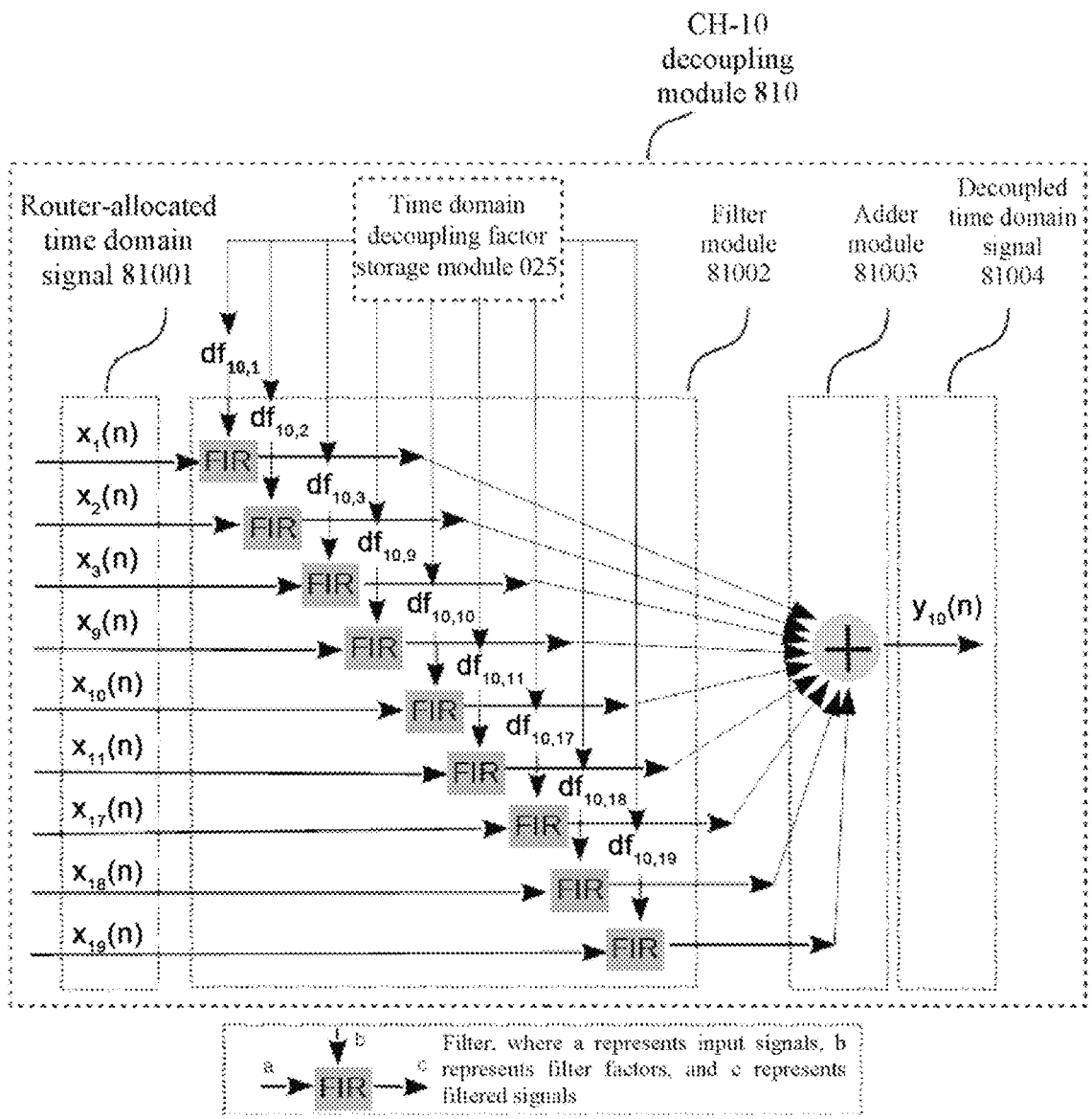
FIG. 10 is a schematic diagram of a decoupling module corresponding to Channel 10 in a time domain decoupling scheme.

Next, Channel 10 (CH-10) will be taken as an example to explain the implementation framework of the CH-10 decoupling module in FIG. 9. FIG. 10 is a schematic diagram of a decoupling module corresponding to Channel 10 in a time domain decoupling scheme.

Assuming that base station antennas are a 64-element rectangular two-dimensional array, referring to FIG. 6, it can be seen that array elements around the array element 10 are array element 1, array element 2, array element 3, array element 9, array element 11, array element 17, array element 18 and array element 19, so there are 9 coupling-related array elements in total including array element 10 itself. Therefore, when Channel 10 is to be decoupled, the channel data corresponding to the nine array elements need to be involved. The channel data corresponding to the nine array elements are convolved with the corresponding decoupling filter factors respectively, and then combined and output.

As shown in FIG. 10, the time domain signal module 81001 for routing allocation represents input signals of the channels involved in decoupling allocated by the router module 800 for the decoupling module 810 corresponding to Channel 10 (CH-10), and input signals of the channels involved in the decoupling of the CH-10 are $x_1(n)$, $x_2(n)$, $x_3(n)$, $x_9(n)$, $x_{10}(n)$, $x_{11}(n)$, $x_{17}(n)$, $x_{18}(n)$, $x_{19}(n)$, respectively.

A filter module 81002 is configured to conduct convolutional filtering, that is, convolution operation, on the input signals of the channels involved in decoupling and a corresponding decoupling factor filter.

An adder module 81003 is configured to combine signals obtained after convolutional filtering of the input signals of the channels involved in decoupling.

A decoupled time domain signal module 81004 is configured to output a decoupled time domain signal of the CH-10.

In an embodiment, the implementation process of the filter module 81002 and the adder module 81003 can be expressed by the following equation (9).

$$y_{10}(n) = x_1(n) * df_{10,1}(n) + x_2(n) * df_{10,2}(n) + x_3(n) * df_{10,3}(n) + \\ x_9(n) * df_{10,9}(n) + x_{10}(n) * df_{10,10}(n) + x_{11}(n) * df_{10,11}(n) + \\ x_{17}(n) * df_{10,17}(n) + x_{18}(n) * df_{10,18}(n) + x_{19}(n) * df_{10,19}(n) \tag{9}$$

In the above equation (9), $df_{10,i}$ represents the decoupling filter factor corresponding to the $i^{th}$ channel when Channel 10 is to be decoupled in the time domain, $x_i(n)$ represents the input signal of the $i^{th}$ channel, and $y_{10}(n)$ represents the output signal of the CH-10 decoupling module in the time domain decoupling scheme.

In an embodiment of the present disclosure, each channel goes through the above decoupling process of Channel 10 in turn, and outputs a decoupled output signal, thus realizing the decoupling operation for antenna array.

According to the antenna array decoupling method of the embodiment of the present disclosure, antenna decoupling can be realized on the uplink/downlink in the time domain or uplink/downlink in the frequency domain without changing antenna hardware, and the realized decoupling functions are relatively independent, without the need for cooperation of other system modules, which provides feasibility for realizing digital domain decoupling in the base station system, and effectively solves the problems of high sidelobe level, degraded array beam scanning capability, reduced effective radiation and serious crosstalk between antenna elements caused by base station antenna coupling, thereby improving system performance of communication systems.

Figure 11:
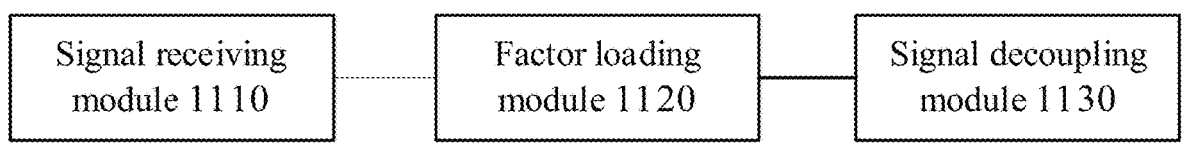
FIG. 11 is a schematic diagram of an antenna array decoupling apparatus according to an embodiment of the present disclosure.

Next, an antenna array decoupling apparatus according to an embodiment of the present disclosure will be described in detail with reference to the figure. FIG. 11 is a schematic diagram of an antenna array decoupling apparatus according to an embodiment of the present disclosure. As shown in FIG. 11, the antenna array decoupling apparatus may include the following modules:

- a signal receiving module 1110 configured to receive predetermined digital domain signals of a plurality of channels, each of the plurality of channels being a data channel corresponding to a respective one of array elements in an antenna array;
- a factor loading module 1120 configured to determine decoupling factors of channels involved in decoupling corresponding to each channel, the decoupling factors being factors that have been solved for beforehand according to measured in-array pattern information of each array element in the antenna array;
- a signal decoupling module 1130 configured to process the predetermined digital domain signals of the channels involved in decoupling corresponding to each channel according to the decoupling factors to obtain a decoupled predetermined digital domain signal of each channel.

In an embodiment, the antenna array decoupling apparatus may also include the following modules:

- a coupled array measurement module configured to measure in-array pattern information of the array elements in the antenna array at a plurality of sampling points in a space at a predetermined frequency point, the in-array pattern information of a respective one of array elements in the antenna array being pattern information measured when only the respective one of array elements is excited;
- an ideal array measurement module configured to calculate in-array pattern information of array elements in an ideal antenna array at the plurality of sampling points at the predetermined frequency point, the ideal antenna array being an antenna array without coupling which is simulated according to an array arrangement of the antenna array;
- a decoupling factor calculation module configured to obtain decoupling factors of the array elements in the antenna array at the predetermined frequency point by correcting the measured in-array pattern information of the array elements in the antenna array with the in-array pattern information of the array elements in the ideal antenna array.

In an embodiment, the decoupling factor calculation module may specifically include:

- a first matrix generation unit configured to generate a first in-array pattern matrix according to the in-array pattern information of the array elements in the antenna array measured at the predetermined frequency point;
- a second matrix generation unit configured to generate a second in-array pattern matrix according to the in-array pattern information of the array elements in the ideal antenna array at the predetermined frequency point;
- a decoupling matrix of the antenna array at the predetermined frequency point being obtained by multiplying a generalized inverse matrix of the first in-array pattern matrix and the second in-array pattern matrix;
- a matrix solving unit configured to extract M decoupling factors of each array element in the antenna array from the decoupling matrix, the M decoupling factors corresponding to M array elements in the antenna array and M being an integer greater than or equal to 2.

In an embodiment, the predetermined frequency point is a frequency point determined according to the bandwidth of signals received by the antenna array and a predetermined frequency interval.

In an embodiment, the factor loading module 1120 can be specifically configured to: determine frequency points of predetermined digital domain signals; and load the decoupling factors of the channels involved in decoupling at the frequency points for the predetermined digital domain signal of each channel.

In an embodiment, the channels involved in decoupling are a specified number of channels located around the channel in question which are determined beforehand according to the array arrangement of the antenna array.

In this embodiment, the antenna array decoupling apparatus may include: a decoupling involved channel determining module configured to determine, according to the array arrangement of the antenna array, a specified number of channels located around each channel beforehand as the channels involved in decoupling.

In an embodiment, when the predetermined digital domain signals are frequency domain signals, the frequency domain signals include downlink frequency domain signals mapped via antenna ports or uplink frequency domain signals before being demapped via the antenna ports.

In this embodiment, when the predetermined digital domain signals are frequency domain signals, the signal decoupling module 1130 may specifically include the following units:

- a signal weighting unit configured to weight the frequency domain signals of the channels involved in decoupling corresponding to each channel by using the decoupling factors corresponding to the determined channels involved in decoupling, so as to obtain weighted frequency domain signals of the channels involved in decoupling corresponding to each channel;
- a frequency domain signal synthesis unit configured to combine the weighted frequency domain signals of the channels involved in decoupling corresponding to each channel to obtain a decoupled frequency domain signal of each of the plurality of channels.

In an embodiment, when the predetermined digital domain signals are time domain signals, the time domain signals include downlink time domain signals with cyclic prefixes inserted or uplink time domain signals before the cyclic prefixes are removed.

In this embodiment, the predetermined digital domain signals are time domain signals, and the signal decoupling module 1130 may specifically include the following units:

- a filter factor determining unit configured to determine filter factors of a decoupling filter for each channel, the filter factors being factors in the time domain corresponding to the decoupling factors of the channels involved in decoupling corresponding to each channel at different frequency points;

a convolutional filtering unit configured to conduct convolutional filtering on the time domain signals of the channels involved in decoupling corresponding to each channel by using the filter factors of the decoupling filters corresponding to the determined channels involved in decoupling, so as to obtain time domain signals after convolutional filtering of the channels involved in decoupling corresponding to each channel;

a time domain signal combining unit configured to combine the time domain signals, obtained after convolutional filtering, of the channels involved in decoupling corresponding to each channel to obtain a decoupled time domain signal of each of the plurality of channels.

In an embodiment, the convolutional filtering unit may specifically include the following subunits:

a filter weighting subunit configured to conduct filter weighting once on time domain signals for the $i^{th}$ channel by using the filter factors of the decoupling filters corresponding to the channels involved in decoupling corresponding to the $i^{th}$ channel, so as to obtain time domain signals after convolutional filtering for the $i^{th}$ channel, the filter weighting subunit being further configured to repeat the filter weighting on the time domain signals for the $i^{th}$ channel after convolutional filtering at regular intervals of a predetermined time delay, until the number of times of filter weighting reaches a predetermined number of times, so as to obtain time domain signals for the $i^{th}$ channel after the predetermined number of times of filter weighting;

a post-filtering synthesis subunit configured to combine the time domain signals for the $i^{th}$ channel after the predetermined number of times of filter weighting to obtain time domain signals after convolutional filtering of the channels involved in decoupling corresponding to the $i^{th}$ channel.

In this embodiment, the $i^{th}$ channel is any channel of the plurality of channels, i is an integer greater than or equal to 1, and i is less than or equal to the total number of the channels; and the predetermined number of times is a number determined according to a filter order or a number of taps of the corresponding decoupling filter.

According to the antenna array decoupling apparatus of the embodiment of the present disclosure, the method for solving the decoupling matrix is applicable to various antenna models, and antenna decoupling can be realized without changing antenna hardware. The method can effectively reduce the design pressure of realizing hardware decoupling in small array design, and has the advantages of small pattern distortion and high adaptability to antenna models. Therefore, the antenna array can be decoupled without increasing the difficulty of antenna design, thus reducing the influence of array coupling and improving system performance.

It should be noted that the present disclosure is not limited to the specific configurations and processes described in the above embodiments and shown in the figures. For the convenience and conciseness of description, the detailed description of known methods is omitted here, and for the specific working processes of the above-described systems, modules and units, one can refer to the corresponding processes in the previous method embodiments, which will not be repeated here.

Figure 12:
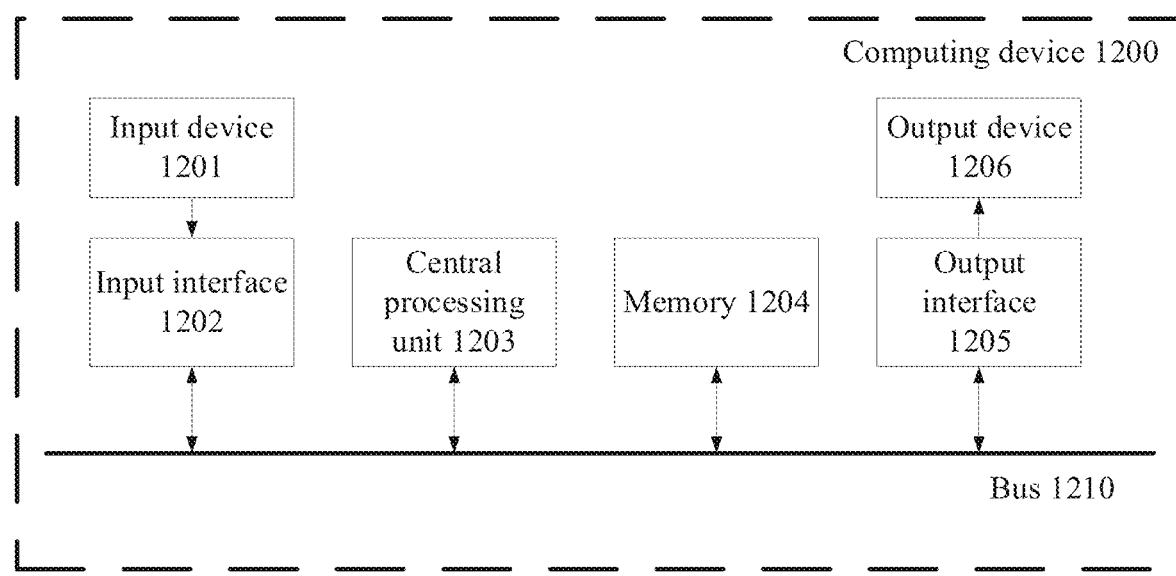
FIG. 12 is a schematic diagram of an example hardware architecture of a computing device which can implement the method and apparatus according to the embodiments of the present disclosure.

FIG. 12 is a schematic diagram of an example hardware architecture of a computing device which can implement the antenna array decoupling method and apparatus according to the embodiments of the present disclosure.

As shown in FIG. 12, the computing device 1200 includes an input device 1201, an input interface 1202, a central processing unit 1203, a memory 1204, an output interface 1205, and an output device 1206. Here, the input interface 1202, the central processing unit 1203, the memory 1204 and the output interface 1205 are connected via a bus 1210, and the input device 1201 and the output device 1206 are connected to the bus 1210 through the input interface 1202 and the output interface 1205, respectively, and thereby connected to other components of the computing device 1200.

The input device 1201 receives input information from the outside and transmits the input information to the central processing unit 1203 through the input interface 1202. The central processing unit 1203 processes the input information based on the computer-executable instructions stored in the memory 1204 to generate output information, temporarily or permanently stores the output information in the memory 1204, and then transmits the output information to the output device 1206 through the output interface 1205. The output device 1206 outputs the output information to the outside of the computing device 1200 for use by a user.

In an embodiment, the computing device 1200 shown in FIG. 12 may be implemented as an antenna array decoupling system, which may include: a memory configured to store a program; and a processor configured to execute the program stored in the memory to perform the antenna array decoupling method described in the above embodiments.

An embodiment of the present disclosure further provides a communication system, including: an antenna array decoupling factor storage configured to store decoupling factors of data channels corresponding to array elements in an antenna array, the decoupling factors being factors that have been solved for beforehand according to measured in-array pattern information of each array element in the antenna array; and an antenna array decoupling system configured to receive predetermined digital domain signals of a plurality of channels, each of the plurality of channels corresponding to a respective one of array elements in the antenna array; to determine decoupling factors of channels involved in decoupling corresponding to each channel; and to process the predetermined digital domain signals of the channels involved in decoupling corresponding to each channel according to the decoupling factors to obtain a decoupled predetermined digital domain signal of each channel.

In this communication system, the antenna array decoupling system and the antenna array decoupling apparatus have the same modules, and can implement the antenna array decoupling method described with reference to the above embodiments. For the convenience and conciseness of description, the detailed description of known methods is omitted here, and for the specific working processes of the above-described systems, modules and units, one can refer to the corresponding processes in the previous method embodiments, which will not be repeated here.

According to the embodiment of the present disclosure, the process described above with reference to the flowchart may be implemented as a computer software program. For example, an embodiment of the present disclosure includes a computer program product, which includes a computer program tangibly embodied on a machine-readable medium, and the computer program contains program codes for executing the method shown in the flowchart. In such an embodiment, the computer program can be downloaded and installed from a network and/or installed from a removable storage medium.

According to the antenna array decoupling method, apparatus and system and the computer-readable storage medium of the embodiments of the present disclosure, the decoupling factors of the antenna array can be solved for by measuring in-array patterns of the array elements in the antenna array of a base station beforehand, and when the digital domain signals of the plurality of channels corresponding to the array elements in the antenna array are received, the digital domain signals of each channel can be decoupled by loading the decoupling parameters. In this method, the decoupling matrix for solving the antenna array is obtained through pattern measurement, pattern distortion is small and adaptability to antenna models is high, and no additional hardware is needed, which reduces the difficulty and pressure of antenna design. Therefore, the antenna array can be decoupled without increasing the difficulty of antenna design, thus reducing the influence of array coupling and improving system performance.

It can be understood by those having ordinary skill in the art that all or some of the steps of the methods, systems and functional modules/units in the devices disclosed above can be implemented as software, firmware, hardware and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

It can be understood that the above embodiments are only example embodiments used to illustrate the principles of the present disclosure, and the present disclosure is not limited thereto. For those having ordinary skill in the art, various modifications and improvements can be made without departing from the teaching and essence of the present disclosure, and these modifications and improvements also fall within the scope of protection of the present disclosure.

The invention claimed is:

1. An antenna array decoupling method comprising:
receiving predetermined digital domain signals of a plurality of channels, each of the plurality of channels being a data channel corresponding to a respective one of array elements in an antenna array;
determining, according to an array arrangement of the antenna array, a specified number of channels located around each of the plurality of channels beforehand as channels involved in decoupling corresponding to each of the plurality of channels;
determining decoupling factors of the channels involved in decoupling, the determined decoupling factors being factors which have been solved for beforehand according to measured in-array pattern information of each array element in the antenna array; and
processing the predetermined digital domain signals of the channels involved in decoupling according to the determined decoupling factors to obtain a decoupled predetermined digital domain signal of each of the plurality of channels.

2. The method of claim 1, before receiving predetermined digital domain signals of a plurality of channels, the method further comprising:
measuring in-array pattern information of the array elements in the antenna array at a plurality of sampling points in a space at a predetermined frequency point, the in-array pattern information of a respective one of array elements in the antenna array being pattern information measured when only the respective one of array elements is excited;
calculating in-array pattern information of array elements in an ideal antenna array at the plurality of sampling points at the predetermined frequency point, the ideal antenna array being an antenna array without coupling which is simulated according to an array arrangement of the antenna array; and
obtaining decoupling factors of the array elements in the antenna array at the predetermined frequency point by correcting the measured in-array pattern information of the array elements in the antenna array with the in-array pattern information of the array elements in the ideal antenna array.

3. The method of claim 2, wherein obtaining decoupling factors of the array elements in the antenna array at the predetermined frequency point by correcting the measured in-array pattern information of the array elements in the antenna array with the in-array pattern information of the array elements in the ideal antenna array comprises:
generating a first in-array pattern matrix according to the in-array pattern information of the array elements in the antenna array measured at the predetermined frequency point;
generating a second in-array pattern matrix according to the in-array pattern information of the array elements in the ideal antenna array at the predetermined frequency point;
multiplying a generalized inverse matrix of the first in-array pattern matrix and the second in-array pattern matrix to obtain a decoupling matrix of the antenna array at the predetermined frequency point; and
extracting M decoupling factors of each array element in the antenna array from the decoupling matrix, the M decoupling factors corresponding to M array elements in the antenna array and M being an integer greater than or equal to 2.

4. The method of claim 1, wherein determining decoupling factors of channels involved in decoupling comprises:
- determining frequency points of the predetermined digital domain signal of each of the plurality of channels; and
- determining the decoupling factors of the channels involved in decoupling according to the frequency points.

5. The method of claim 1, wherein:
- the predetermined digital domain signals are frequency domain signals; and
- processing the predetermined digital domain signals of the channels involved in decoupling according to the determined decoupling factors to obtain a decoupled predetermined digital domain signal of each of the plurality of channels comprises:
  - weighting the frequency domain signals of the channels involved in decoupling by using the determined decoupling factors of the channels involved in decoupling, so as to obtain weighted frequency domain signals of the channels involved in decoupling; and
  - combining the weighted frequency domain signals of the channels involved in decoupling to obtain a decoupled frequency domain signal of each of the plurality of channels.

6. The method of claim 1, wherein:
- the predetermined digital domain signals are time domain signals; and
- processing the predetermined digital domain signals of the channels involved in decoupling according to the determined decoupling factors to obtain a decoupled predetermined digital domain signal of each of the plurality of channels comprises:
  - determining filter factors of a decoupling filter corresponding to each of the plurality of channels, the filter factors being factors in the time domain corresponding to the determined decoupling factors of the channels involved in decoupling at different frequency points;
  - conducting convolutional filtering on the time domain signals of the channels involved in decoupling according to the filter factors of the decoupling filters corresponding to the channels involved in decoupling, so as to obtain time domain signals after convolutional filtering of the channels involved in decoupling; and
  - combining the time domain signals, obtained after the convolutional filtering, of the channels involved in decoupling to obtain a decoupled time domain signal of each of the plurality of channels.

7. The method of claim 6, wherein conducting convolutional filtering on the time domain signals of the channels involved in decoupling according to the filter factors of the decoupling filters corresponding to the channels involved in decoupling, so as to obtain time domain signals after convolutional filtering of the channels involved in decoupling comprises:
- conducting filter weighting once on time domain signals for the $i^{th}$ channel by using the filter factors of the decoupling filters corresponding to the channels involved in decoupling corresponding to the $i^{th}$ channel, so as to obtain time domain signals after convolutional filtering for the $i^{th}$ channel;
- repeating the filter weighting on the time domain signals for the $i^{th}$ channel after convolutional filtering at regular intervals of a predetermined time delay, until the number of times of filter weighting reaches a predetermined number of times, so as to obtain time domain signals for the $i^{th}$ channel after the predetermined number of times of filter weighting; and
- combining the time domain signals for the $i^{th}$ channel after the predetermined number of times of filter weighting to obtain time domain signals after convolutional filtering of the channels involved in decoupling corresponding to the $i^{th}$ channel,
  - the $i^{th}$ channel being any channel of the plurality of channels, i being an integer greater than or equal to 1 and i being less than or equal to the total number of the channels, and
  - the predetermined number of times being a number determined according to a filter order or a number of taps of the corresponding decoupling filter.

8. The method of claim 1, wherein:
- in response to the predetermined digital domain signals being frequency domain signals, the frequency domain signals comprise downlink frequency domain signals mapped via antenna ports or uplink frequency domain signals before being demapped via the antenna ports; and
- in response to the predetermined digital domain signals being time domain signals, the time domain signals comprise downlink time domain signals with cyclic prefixes inserted or uplink time domain signals before the cyclic prefixes are removed.

9. A non-transitory computer-readable storage medium storing instructions which, when executed by a computer, cause the computer to implement the antenna array decoupling method of claim 1.

10. A communication system, comprising:
- an antenna array decoupling factor storage configured to store decoupling factors of data channels corresponding to array elements in an antenna array, the decoupling factors being factors which have been solved for beforehand according to measured in-array pattern information of each array element in the antenna array; and
- an antenna array decoupling system configured to receive predetermined digital domain signals of a plurality of channels, each of the plurality of channels corresponding to a respective one of array elements in the antenna array;
  - to determine, according to an array arrangement of the antenna array, a specified number of channels located around each of the plurality of channels beforehand as channels involved in decoupling corresponding to each of the plurality of channels;
  - to determine decoupling factors of the channels involved in decoupling from the antenna array decoupling factor storage; and
  - to process the predetermined digital domain signals of the channels involved in decoupling according to the determined decoupling factors to obtain a decoupled predetermined digital domain signal of each of the plurality of channels.

11. The communication system of claim 10, wherein
- in response to the predetermined digital domain signals being frequency domain signals, the frequency domain signals comprise downlink frequency domain signals mapped via antenna ports or uplink frequency domain signals before being demapped via the antenna ports; and
- in response to the predetermined digital domain signals being time domain signals, the time domain signals comprise downlink time domain signals with cyclic prefixes inserted or uplink time domain signals before the cyclic prefixes are removed.

12. An antenna array decoupling system comprising:

a memory configured to store executable program codes; and a processor configured to execute the executable program codes stored in the memory to perform an antenna array decoupling method comprising:

receiving predetermined digital domain signals of a plurality of channels, each of the plurality of channels being a data channel corresponding to a respective one of array elements in an antenna array;

determining, according to an array arrangement of the antenna array, a specified number of channels located around each of the plurality of channels beforehand as channels involved in decoupling corresponding to each of the plurality of channels;

determining decoupling factors of the channels involved in decoupling, the determined decoupling factors being factors which have been solved for beforehand according to measured in-array pattern information of each array element in the antenna array; and processing the predetermined digital domain signals of the channels involved in decoupling according to the determined decoupling factors to obtain a decoupled predetermined digital domain signal of each of the plurality of channels.

\* \* \* \* \*